United States Patent [19]
Feigin et al.

[11] 3,803,753
[45] Apr. 16, 1974

[54] METHOD FOR CONTROLLING YELLOW JACKET POPULATIONS

[75] Inventors: Abner Oscar Feigin, Mountain Lakes; Cedric Copeland Jennings, Towaco, both of N.J.; Floyd Leroy Bailey, Jackson, Miss.; Russell Yerby Smith, Jr., Brookside, N.J.

[73] Assignee: Allied Chemical Corporation, New York, N.Y.

[22] Filed: May 25, 1973

[21] Appl. No.: 363,938

Related U.S. Application Data

[63] Continuation of Ser. No. 124,130, March 15, 1971, abandoned.

[52] U.S. Cl................ 119/131, 119/132 R, 424/219
[51] Int. Cl........................................... A01m 01/02
[58] Field of Search.......... 43/131, 122, 107, 132 R, 43/132 A, 121; 424/17, 219

[56] References Cited
UNITED STATES PATENTS

| | | | |
|---|---|---|---|
| 420,490 | 2/1890 | Barnard | 43/122 |
| 1,591,854 | 7/1926 | March | 43/122 |
| 1,666,785 | 4/1928 | March | 43/122 |
| 1,737,429 | 11/1929 | Milewski | 43/122 |
| 3,485,868 | 12/1969 | Eddy et al | 424/219 X |

*Primary Examiner*—James H. Czerwonky
*Attorney, Agent, or Firm*—Fred L. Kelly

[57] ABSTRACT

A method for facilitating control of yellow jackets by baiting. The bait is dispensed from a container, preferably a standard can, by means of a protective feeder cover. The protective cover permits easy access for the yellow jackets but keeps birds and animals out. The bait is fish-flavored food containing dodecachlorooctahydro-1,3,4-metheno-2H-cyclobuta [cd] pentalene. The bait is used in combination with a yellow jacket attractant consisting of heptyl butyrate. The attractant is placed on absorbant material which is separately positioned in the container.

2 Claims, 1 Drawing Figure

PATENTED APR 16 1974

3,803,753

INVENTORS
ABNER O. FEIGIN
CEDRIC C. JENNINGS
FLOYD L. BAILEY
RUSSELL Y. SMITH, Jr.

BY F. L. Keely

ATTORNEY

METHOD FOR CONTROLLING YELLOW JACKET POPULATIONS

This is a continuation, of application Ser. No. 124,130, filed Mar. 15, 1971, and now abandoned.

BACKGROUND OF THE INVENTION

This invention relates to yellow jacket control by baiting.

The term yellow jacket is applied to any of several American social wasps of the genus Vespa, in which the color of the body is partly yellow. These wasps are noted for their irritability and painful stings.

It is well known that envenomization by yellow jackets constitutes a serious problem for great numbers of individuals. The number of people with hypersensitivity to vespid venom is significant, as is the number of seriously affected human victims of such stings that are recorded each year. Moreover, the yellow jacket problem has become so severe in some areas that it is impossible to eat in the open without a high risk of being stung.

Because no known method for yellow jacket control is entirely satisfactory, extensive efforts have been made to develop a practical yellow jacket control method that will result in substantially complete control within a few days.

SUMMARY OF THE INVENTION

The present invention relates to control of yellow jacket populations by baiting. The invention relates in particular to an improved yellow jacket baiting device and a method of using said device whereby control of yellow jacket populations is facilitated with minimum danger to birds, animals, and beneficial insect species such as bees.

Broadly, the method includes:

a. providing a container containing the bait, said container being open at the top;

b. demountably engaging the top edge of the container with a cover having a top and a wall, said cover having a multiplicity of apertures about 0.5 inch in diameter at preselected spaced intervals around the upper portion of the wall, said wall extending at least about 2 inches above the top of the container, whereby birds are protected from eating the bait; and c. mounting said container in an upright position out of reach of children and animals.

The bait is preferably a fish-flavored proteinaceous food, such as cat food, having a small amount of toxicant dissolved therein; the preferred toxicant is dodecachlorooctahydro-1,3,4-metheno-2H-cyclobuta[cd] pentalene, for reasons discussed hereinafter.

Broadly, the device for baiting yellow jackets with toxicant-containing bait comprises:

a. a container for the bait, said container being open at the top;

b. a cover having a top and a wall demountably engaging the top edge of the container, said cover having a multiplicity of apertures about 0.5 inch in diameter spaced at preselected intervals around the upper portion of the wall, said wall extending at least about 2 inches above the top of the container, whereby birds are protected from eating the bait; and c. means for mounting said container in an upright position out of reach of children and animals.

The container is preferably a standard can which may also be used for storage and shipment of the bait if desired.

BRIEF DESCRIPTION OF THE DRAWING

The FIGURE is a sectional elevation and schematic view of a yellow jacket baiting device illustrative of a preferred embodiment of the invention.

DESCRIPTION OF THE PREFERRED EMBODIMENT

Figure 1:
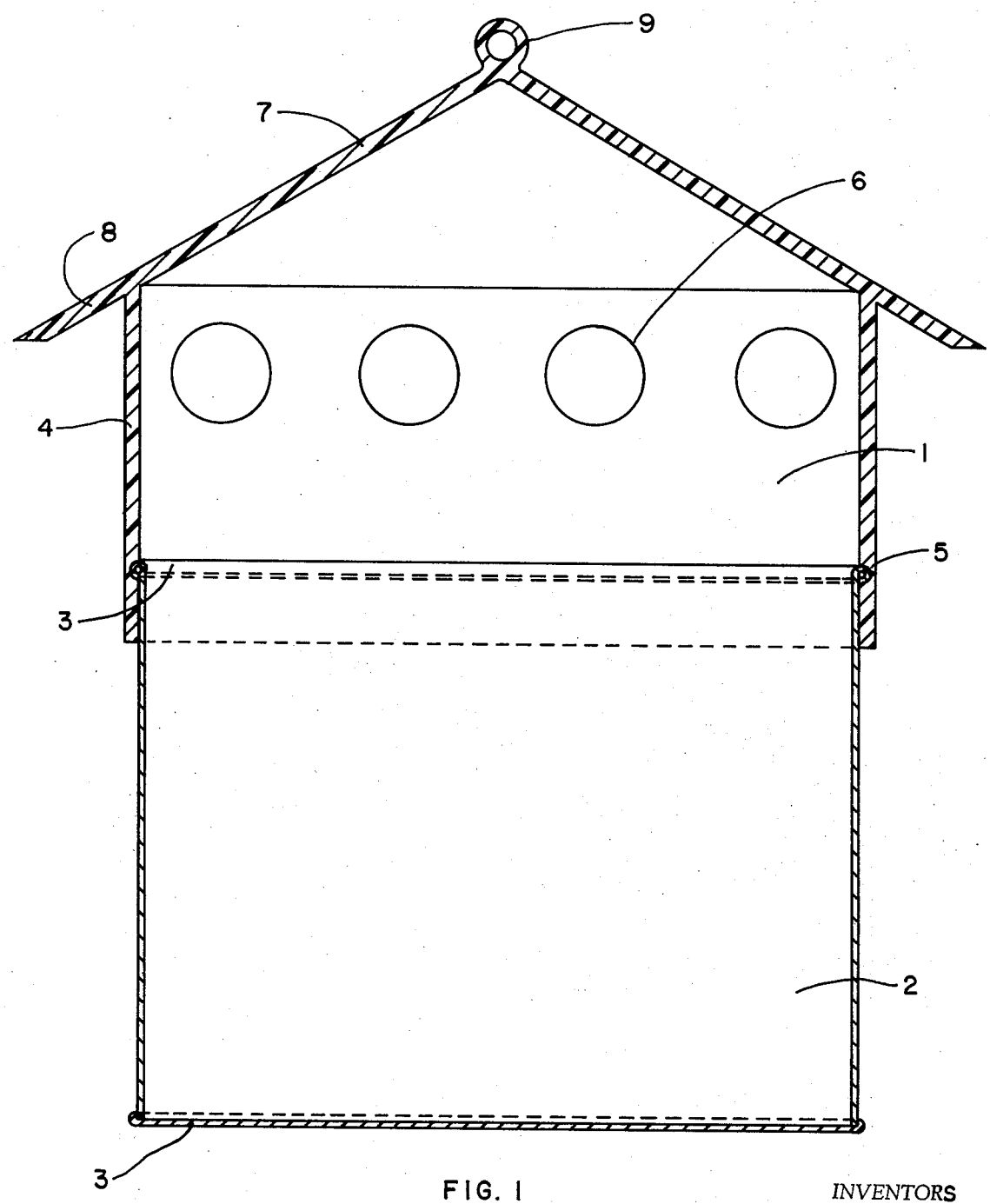

The life cycle of the yellow jacket is well known. The nest is begun in the early spring by an over-wintering mated queen. The queen feeds on carbohydrates such as nectar and gathers proteinaceous substances only as larval food for the first brood of workers. After emergence of the workers, she remains in the nest.

During late spring and summer, as subsequent broods of larvae are reared by existing workers, proteinaceous materials are gathered in increasing quantities. In late summer new queens and males are produced in the colony and emerge to find mates. The males are seen visiting flowers for nectar. Apparently the new queens mate and almost immediately find a site in which to hibernate until the next year.

Because yellow jackets feed upon two classes of materials, adults on carbohydrate and larvae on proteinaceous foods, a choice of bait appears possible. However, carbohydrate bait is undesirable because most of the beneficial hymenopterous species such as the honey bee could also be destroyed by a thorough carbohydrate baiting technique.

The morphology of the yellow jacket adult precludes the ingestion of solid proteinaceous larval foods. Therefore, toxicant in a proteinaceous bait base can accumulate in the nest before the foraging workers receive a lethal dose.

In accordance with one preferred embodiment of the invention, a standard cylindrical can, such as is used for cat food, having a diameter of 3 to 4 inches and a height of 3 to 4 inches is used as the container for the bait. Standard cans are conventionally made of sheet metal and have a radially encircling rim around the top and bottom edges. If desired, the can may be used in closed form for shipment and storage of the bait, the can being opened at the top when the baiting device is assembled. The most practical bait base is fish or fish-flavored proteinaceous food, e.g., cat food, because it is acceptable to the yellow jacket, low in cost, readily available, and compatible with most toxicants. The preferred toxicant is dodecachlorooctahydro-1,3,4,metheno-2H-cyclobuta[cd] pentalene, commercially available in "Mirex" insecticide. It has been found this toxicant, at preferred toxicant levels of 0.5 to 2 percent, based on the weight of the bait, is surprisingly attractive to yellow jackets, whereas other insecticides, including chlorinated hydrocarbons and organophosphorous compounds, showed various degrees of repellency.

The method involves inserting the open top of the can containing the bait into a protective feeder cover constructed of resilient material such as polyethylene or a flurocarbon resin. The preferred construction material is polyethylene, which is readily available and low in cost. The cover has a top and a cylindrical wall having a groove encircling the lower inside of the wall to engage the top rim of the can. The can is inserted into the protective cover until the top rim of the can catches firmly in the groove. As outlined hereinabove, the cover has a multiplicity of apertures about 0.5 inch in diameter spaced at preselected intervals around the upper portion of the wall, and the wall extends at least about 2 inches above the top of the can. It is desirable to have as many apertures as possible without undue weakening of the wall of the cover. Preferably, the wall has about 10 to 15 apertures and extends about 2 to 3 inches above the top of the can. The location and size of the apertures permits free passage of yellow jackets but prevents birds from reaching the bait when the can is maintained in its normal upright position.

Means are provided for mounting the can in a vertical, i.e., upright position, whereby the bait remains in the container until consumed by the yellow jackets. Preferably, the mounting means comprises a centrally located eyelet molded onto the top of the polyethylene cover. A cord is attached to the eyelet and the device is hung to a tree limb or any suitable support so that the baiting device is out of reach of children and animals. Preferably, the baiting device is placed clear of foliage and at a height of 5 to 7 feet above ground level. In mounting the baiting device, it is not necessary to know where the yellow jacket nest is located; the yellow jackets forage over an extended area and the bait is carried back to the nest by the yellow jackets. For large areas, baiting stations are preferably located about 100 to 150 feet apart.

The top of the protective feeder cover may be flat or sloped or of any suitable shape that will shed rainfall. When the cover is of plastic material such as polyethylene, it is desirably shaped so that it can be molded by conventional methods. Desirably, the top of the cover is cone shaped or dome shaped and has an edge that overhangs the cylindrical wall to act as a rain shield to prevent water from entering the apertures. However, it will be understood that the shape of the top of the cover is not a critical feature of the invention.

The yellow jacket baiting device is preferably used in combination with an attractant for yellow jackets. Heptyl butyrate, 2,4-hexadienyl butyrate and related compounds are highly attractive to yellow jackets. Heptyl butyrate is preferred because it has proved highly specific to Vespula wasps, i.e., no other insects were attracted. For best results, the attractant is not mixed with the yellow jacket bait. Preferably, the heptyl butyrate is absorbed on paper and placed in a container which is tied to the top of the baiting device, the container being opened when the baiting device is assembled for use.

The yellow jacket baiting device is preferably placed away from areas where people pass or congregate. The bait is harmful if swallowed, and skin contact with the bait should be avoided. Control of the yellow jackets will not be noticed for several days as the bait acts slowly, giving the yellow jackets time to feed it to their young and queen, thus killing all stages, even those in the nest.

The FIGURE is a sectional elevation and schematic view of a yellow jacket baiting device illustrative of a preferred embodiment of the invention. In the FIGURE, the protective feeder cover 1 of the device is shown in combination with a standard, cylindrical metal can 2, which is open at the top. The can is provided with two rims 3, which are located on opposing ends of the can. The can is arranged in vertical, i.e., upright position, for holding the bait (not shown).

The protective feeder cover 1 is preferably constructed of a resilient material such as polyethylene. Cover 1 is provided with a cylindrical wall 4, which is suitably sized to firmly grip can 2 and has a groove 5 that demountably engages the top rim of the can. Can 2 is shown inserted into the protective cover 1 so that the top rim of the can catches firmly in the groove 5. Wall 4 extends about 2 to 3 inches above the top of the can and has a multiplicity of apertures 6 about 0.5 inch in diameter spaced at predetermined intervals around the top of the wall 4. Cover 1 is provided with a top 7 having an overhang 8 that acts as a rain shield to prevent rain from entering the apertures 6. The top 7 is provided with a centrally located eyelet 9 for attachment of a supporting line or cord (not shown). The eyelet is preferably molded on the top of the cover.

The following examples are provided to more fully illustrate the instant invention.

EXAMPLE 1

The baiting device for yellow jacket control used in this example is constructed as shown in the FIGURE, wherein the protective feeder cover 1 is shown in combination with a standard cylindrical can 2 which contains the bait (not shown) and is open at the top. The can is of metal and the cover is of polyethylene. The can is provided with conventional rims 3 which are located on opposing ends of the can. The can is about 3 inches high and about 3.5 inches in diameter.

Cover 1 is provided with a cylindrical wall 4 which has a groove 5 that demountably engages the top rim of the can. Wall 4 extends 2 inches above the top of the can and has 10 apertures 6, 0.5 inch in diameter spaced at regular intervals around the wall. Cover 1 has a cone-shaped top 7 having an overhang 8 that serves as a rain shield to prevent rain from entering the apertures. The top 7 is provided with a centrally located eyelet 9 for attachment of a supporting cord (not shown).

The bait base is a commercially available cat food composed chiefly of fish, poultry byproducts and cereals. Sufficient dodecachlorooctahydro-1,3,4-metheno-2H-cyclobuto[cd]pentalene is mixed with the bait base to provide baits containing about 0.5 percent of the toxicant, based on the total weight of the bait. Yellow jacket baiting tests were carried out as follows.

The standard can containing the bait and open at the top is inserted in the polyethylene cover, open side up. The can is inserted into the cover until the rim of the can catches firmly in the groove inside the wall of the cover, as shown in the FIGURE.

A yellow jacket attractant container is tied to the top of the baiting device. The attractant, heptyl butyrate, is absorbed on paper and placed in the container which is open at one end. This attractant is highly specific to Vespula wasps in that it does not appear to attract other insects.

The assembled baiting device is hung to a tree limb by a cord attached to the eyelet on the top of the cover. The height of the device above ground level is about 5 feet, out of reach of children and animals. Birds are unable to reach the bait because of the structure of the polyethylene protective cover and the upright position of the baiting device.

The device is placed in an area frequented by yellow jackets. About 75 grams of bait is removed from the device in a 24 hour period, and effective control of the yellow jacket population is obtained within one week.

EXAMPLE 2

In field tests following the procedure of Example 1, excellent control of yellow jackets is obtained in test areas ranging in size from a single residential lot to about 100 acres. One baiting device per 5 acres gives good control. Rebaiting is done only when most of the bait is removed by the yellow jackets within the first week of control. Surprisingly, when the amount of the insecticide dodecachlorooctahydro-1,3,4-metheno-2 H-cyclobuta [cd] pentalene in the bait is increased from 0.5 percent to 1 percent the weight of bait removed in a 24 hour period is increased about 14 percent, which data indicate that this toxicant is an attractant to the yellow jackets. Moreover, the most acceptable concentration of the insecticide appears to be 2 percent; however, this concentration does not appear to improve on control obtained at 1 percent concentration of insecticide. Yellow jacket control is obtained within one week. In this example, the heptyl butyrate attractant is used in all of the tests.

We claim:

1. In a method of controlling yellow jacket populations by baiting, which comprises:
   a. providing a container containing a bait, said container being open at the top;
   b. demountably engaging the top edge of the container with a cover having a top and a wall, said cover having a multiplicity of apertures about 0.5 inch in diameter at preselected spaced intervals around the upper portion of the wall, said wall extending about 2 to 3 inches above the top of the container, whereby birds are prevented from eating the bait; and
   c. mounting said container in an upright position out of reach of children and animals, the improvement comprising:
      1. using as bait a fish-flavored proteinaceous food containing about 0.5 to 2 percent of dodecachlorooctahydro-1,3,4,-metheno-2H-cyclobuta[cd]pentalene, based on the weight of the bait, and
      2. using said bait in combination with a yellow jacket attractant consisting of heptyl butyrate, said attractant being placed on an absorbant material separately positioned in said container.

2. The method as claimed in claim 1 wherein the container provided is a vertical cylindrical metal can of the type having two rims located on opposing ends of the can and the cover is constructed of polyethylene and has a groove encircling the lower internal portion of the wall to engage the top rim of the can.

* * * * *